United States Patent
Bergmann et al.

(10) Patent No.: US 6,178,284 B1
(45) Date of Patent: Jan. 23, 2001

(54) VARIABLE SINGLE-MODE ATTENUATORS BY SPATIAL INTERFERENCE

(75) Inventors: Ernest E. Bergmann, Fountain Hill Borough, Lehigh County, PA (US); Joseph E. Ford, Monmouth; James A. Walker, Howell, both of NJ (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/163,581

(22) Filed: Sep. 30, 1998

(51) Int. Cl.$^7$ ............................................. G02B 26/02
(52) U.S. Cl. ........................... 385/140; 359/846; 359/850
(58) Field of Search .................................. 385/15, 18, 25, 385/31, 47, 48, 140; 359/298, 302, 318, 846, 847, 850, 851, 855, 856, 857, 865

(56) References Cited

U.S. PATENT DOCUMENTS

| | | | |
|---|---|---|---|
| 4,516,827 | * 5/1985 | Lance et al. | 385/140 |
| 4,591,786 | 5/1986 | Koo et al. | 324/244 |
| 4,683,421 | 7/1987 | Miller et al. | 324/96 |
| 4,753,511 | 6/1988 | Bowers et al. | 350/96.21 |
| 4,850,670 | 7/1989 | Mathis et al. | 350/96.21 |
| 4,878,730 | 11/1989 | Wall | 250/96.21 |
| 4,896,938 | 1/1990 | Mathis et al. | 350/96.21 |
| 4,934,785 | 6/1990 | Mathis et al. | 350/96.21 |
| 5,311,614 | 5/1994 | Caron et al. | 385/140 |
| 5,319,733 | 6/1994 | Emmons et al. | 385/140 |
| 5,420,711 | 5/1995 | Snyder | 359/173 |
| 5,432,875 | 7/1995 | Korkowski et al. | 385/27 |
| 5,500,761 | 3/1996 | Goossen et al. | 359/290 |
| 5,518,400 | 5/1996 | Otoide et al. | 434/4 |
| 5,734,778 | 3/1998 | Loughlin et al. | 385/140 |
| 5,745,271 | 4/1998 | Ford et al. | 359/130 |
| 5,781,341 | 7/1998 | Lee | 359/578 |
| 5,796,880 | 8/1998 | Ford et al. | 385/1 |
| 5,900,983 | * 5/1999 | Ford et al. | 385/140 X |
| 5,915,063 | * 6/1999 | Colbourne et al. | 385/140 |

OTHER PUBLICATIONS

Joseph E. Ford et al., *Micromechanical Fiber–Optic Attenuator with 3 μs Response*, 16 J. Lightwave Tech. 1663–1670 (Sep. 1998).

Raanan A. Miller and Yu–Chong Tai, *Micromachined Electromagnetic Scanning Mirrors*, 36 Optical Engineering 1399–1407 (May 1997).

N. Fukushima et al., *Non–Mechanical Variable Attenuator Module Using Faraday Effect* (No Journal Name or Date Given).

Sunny Bains, *Micromachined Parts Readied for HDTV*, EE Times, 2 pp. (No Date Given).

Optical Attenuator, FDK Corporation (5 pages) (Product Brochure, No Date Given).

Challenging the Outer Edge of Optoelectronics Technology, FDK America, Inc. Aug. 1998 (1 page) Lightwave.

R. S. Longhurst, *Multiple Beam Interferometry*, in Geometrical and Physical Optics 153–183 (John Wiley & Sons Inc. ed., 1957), Chapter IX.

C. Marxer et al., *MHz Opto–Mechanical Modulator*, Proc. Transducers (1995), 4 pp.

(List continued on next page.)

Primary Examiner—John D. Lee
(74) Attorney, Agent, or Firm—Synnestvedt & Lechner LLP

(57) ABSTRACT

An optical attenuator is disclosed that utilizes the concept of destructive and constructive interference to enhance the ability to attenuate the light signal sent between an optical transmitter and an optical receiver. Rather than completely blocking out a portion of the light signal or utilizing a membrane coated with a partially reflecting material, the present invention utilizes a very high reflectivity coating on divided surfaces, and controls the relative distances between each of the divided surfaces and the optical transmitter/receiver.

22 Claims, 9 Drawing Sheets

OTHER PUBLICATIONS

K. Aratani, *Process and Design Considerations for Surface Micromachined Beams for a Tuneable Interferometer Array in Silicon,* Proc. IEEE MEMS Workshop 230–235 (1993).

*VCA Series Motorized Attenuator,* Fibercell, Inc. (Preliminary Product Information, 2 pages), Oct. 1997.

* cited by examiner

VARIABLE SINGLE-MODE ATTENUATORS BY SPATIAL INTERFERENCE

BACKGROUND OF THE INVENTION

1. Field of the Invention

The present invention relates to a variable attenuator for attenuating an optical signal transmitted between an optical signal source and an optical signal receiver. More specifically, the present invention relates to the reflection of a transmitted optical signal off of divided surfaces for variably attenuating the optical signal.

2. Description of the Related Art

In optical data communications, signals are typically transmitted from a signal source to a signal receiver over an optical fiber network. FIG. 1 illustrates the general concept of optical signal transmission between an optical signal source 5 and an optical signal receiver 10, using a high reflectivity (HR) coated surface 15. For the sake of simplicity the various light beams illustrated in the figures are all shown as arcs to help in distinguishing their direction of travel; this illustration should not be considered as indicating any particular characteristic of the light beams themselves.

Suppose light is introduced into the system through the optical signal source 5 (e.g., a single mode optical fiber). As the light exits the end of the optical signal source 5 it starts to spread out to form the "sending beam" 7. Sending beam 7 is illustrated as a series of solid arcs moving from the top of FIG. 1 to the bottom of FIG. 1. Sending beam 7 is collimated by a lens 20 (or other focusing means) and then it falls upon the HR coated surface 15.

The reflection of the sending beam 7 by the HR coated surface 15 is a "returning beam" 12 that travels to optical signal receiver 10 (e.g., a single mode fiber). The returning beam 12 is illustrated as a series of dotted-line arcs moving from the bottom of FIG. 1 to the top of FIG. 1. Returning beam 12 is refocused (by the same lens 20 as used for sending beam 7 or by a different focusing means, such as a separate lens) to be collected by optical signal receiver 10.

It is well known that if the HR coated surface 15 is a nearly flat, highly reflecting surface, the optical coupling from the optical signal source 5 to the optical signal receiver 10 will be very good, less than 0.5 dB loss in typical implementations using active alignment in manufacture. Further, it is well understood that if the reflecting surface of HR coated surface 15 is translated left or right by a few microns, the optical coupling will be changed negligibly.

Optical signal systems have a signal intensity range in which they function best. If a signal falls below the operational range, the system will either incorrectly detect the signal or will not detect the signal at all. If the signal is above the operational range, the system will saturate and may result in a false reading of the data in the optical signal. Thus, optical signal levels which are too high or too low result in unreliable transmission of data or can interfere with other data-carrying signals.

The path attenuation of a fiber is a function of fiber length and the fiber attenuation coefficient. Further, the sensitivity of the receiver and the emitter output may exhibit changes due to aging. Thus, many optical transmission lines are designed with built-in attenuators which attenuate the optical signals within the waveguide to be within the optimal functional range of the optical system.

There are several known ways of providing attenuation of an optical signal. One method involves the use Faraday rotation in suitable doped Garnet films. By varying the applied magnetic field from an electromagnet, the polarization of transmitted light is changed and by using polarization selective optical elements, the attenuation can be varied. A problem with this attenuation method is that the electromagnet dissipates large amounts of electrical power and is quite large.

Another known method of attenuation involves the use of motorized variable attenuators where, for example, an opaque attenuating wedge is driven into the beam path to block a portion of the optical signal beam. In addition to being bulky, however, this method also is costly and slow-acting.

An additional attenuation method involves the use of liquid crystal designs which can work at very low electrical power levels and which function in a manner similar to Faraday rotation, but with liquid crystal rotation of polarization. Such systems are temperature and polarization sensitive and organic material in the beam path can be chemically unstable, causing shortened device life.

Attenuation using Micro Electro Mechanical Systems (MEMS) technology has been accomplished using a Mechanical AntiReflection Switch (MARS) modulator, an example of which is illustrated in FIGS. 2 and 3. These devices operate on the principle that varying the phase between two portions of a light beam allows the attenuation of the optical signal to be controlled, as described in more detail below. FIG. 2 shows a cross-section of a typical MARS modulator, and FIG. 3 is a top view of the MARS modulator depicted in FIG. 2. A typical MARS modulator 50 has a conductive or semi-conductive based substrate 52 that is transparent to the operating optical band width of the modulator.

A membrane 54 is suspended above the substrate 52, thereby defining an air gap 56 in between the substrate 52 and the membrane 54. A membrane 54 is typically fabricated from a silicon nitride film which is a dielectric. A metal film 58 is deposited around the top periphery of the membrane 54. Since the metal film 58 is optically opaque, only the center 60 of the membrane 54 remains optically active. When an electrostatic potential is applied in between the metal film 58 and the below lying substrate 52, the metal film 58 becomes charged and is deflected by electrostatic forces toward the substrate 52. The result is that the membrane 58 deflects dowardwardly in the direction of arrows 59 and the size of the air gap 56 is reduced. By applying a potential difference of about 40 volts to electrical connections coupled to the membrane 54 and the substrate 52, large electric fields are developed between the substrate 52 and metal film 58 causing an electrostatic force between the membrane 54 and the underlying silicon large enough to bow the membrane 54 closer to the underlying silicon. By increasing the applied voltage, the cavity width is decreased. By varying the cavity width, the relative phase between light reflected by the membrane 54 and light reflected by the underlying substrate 52 is also varied, thereby allowing control of the attenuation.

In order to assemble the device and in order to equalize the gas pressure on each side of the membrane 54, and allow quick response time, it is necessary to perforate the membrane 54 with very small holes. In FIG. 3 the perforation of the membrane 54 with very small holes 62 is depicted. The membrane 54 has a natural mechanical resonance; the resonance is damped by the gas viscosity passing through the holes 62. The inclusion of the holes 62 in the membrane 54 results in an optical loss, but the size and number of the holes 62 is selected to minimize this optical loss to a negligible level. Typically such holes 62 are approximately 3–5 μM in diameter and are provided merely to minimize vibration, i.e., they do not provide any optical functions.

FIG. 4 is a partial cross-sectional view of the prior art MARS modulator of FIG. 2. Light traveling from top to bottom, identified as 64 in FIG. 4, will be partially reflected by the membrane 54 and partially transmitted beyond the membrane 54. The partially reflected light is identified as 66 in FIG. 4. The light transmitted beyond the membrane 54 is reflected by the floor of the cavity; this reflected light is identified as 68 in FIG. 4. Depending upon the cavity width and the wavelength of light used, the reflections will interfere constructively or destructively when they are received by an optical receiver (not shown). Constructive interference occurs when the wavelengths of the two reflected signals are in sync with each other, thereby enhancing the strength or power of the returned signal, i.e., the signal is not attenuated. Destructive interference refers to the effect caused by the receipt at the light collector of the two reflected signals in an "out of sync" state, which results in a signal of lesser strength or power, i.e., an attenuated signal. Thus, by varying the cavity width, the attenuation of the optical signal can be increased or decreased selectively.

The cavity widths for maximum total reflectivity and for minimum total reflectivity differ by ¼ wavelength. Thus, by applying a suitable change of voltage between the metal film 58 and the substrate 52, the membrane 58 can be moved from one extreme in reflectivity to the other, thus passing through the total range of possible attenuations by moving only about 0.4 microns (for radiation at 1545 nm). Further degradation in performance (e.g., high attenuation occurring at the minimum attenuation point) is likely to occur where there are membrane holes in the optical path, although the degradation is negligible.

SUMMARY OF THE INVENTION

The present invention utilizes the concept of destructive and constructive interference to enhance the ability to attenuate the light signal sent between an optical transmitter and an optical receiver. Rather than completely blocking out a portion of the light signal or utilizing a membrane coated with a partially reflecting material as is known in the prior art, the present invention utilizes a very high reflectivity coating on divided surfaces, and controls the relative distances between each of the divided surfaces and the optical transmitter/receiver. In a first embodiment, a moveable membrane is coated with a highly reflective coating and an opening or openings are provided in the membrane of a size large enough to allow a portion of an optically transmitted signal to pass beyond the membrane and be reflected off of a second highly reflective surface underneath the membrane. In a second embodiment, a fixed surface is coated with highly reflective material and a second surface that is moveable with respect to the first surface, and which is also coated with highly reflective material, is situated such that each of the first and second surfaces receive a portion of a light beam and reflects the same back to the optical receiver.

DETAILED DESCRIPTION OF THE PRESENTLY PREFERRED EMBODIMENTS

Figure 1:
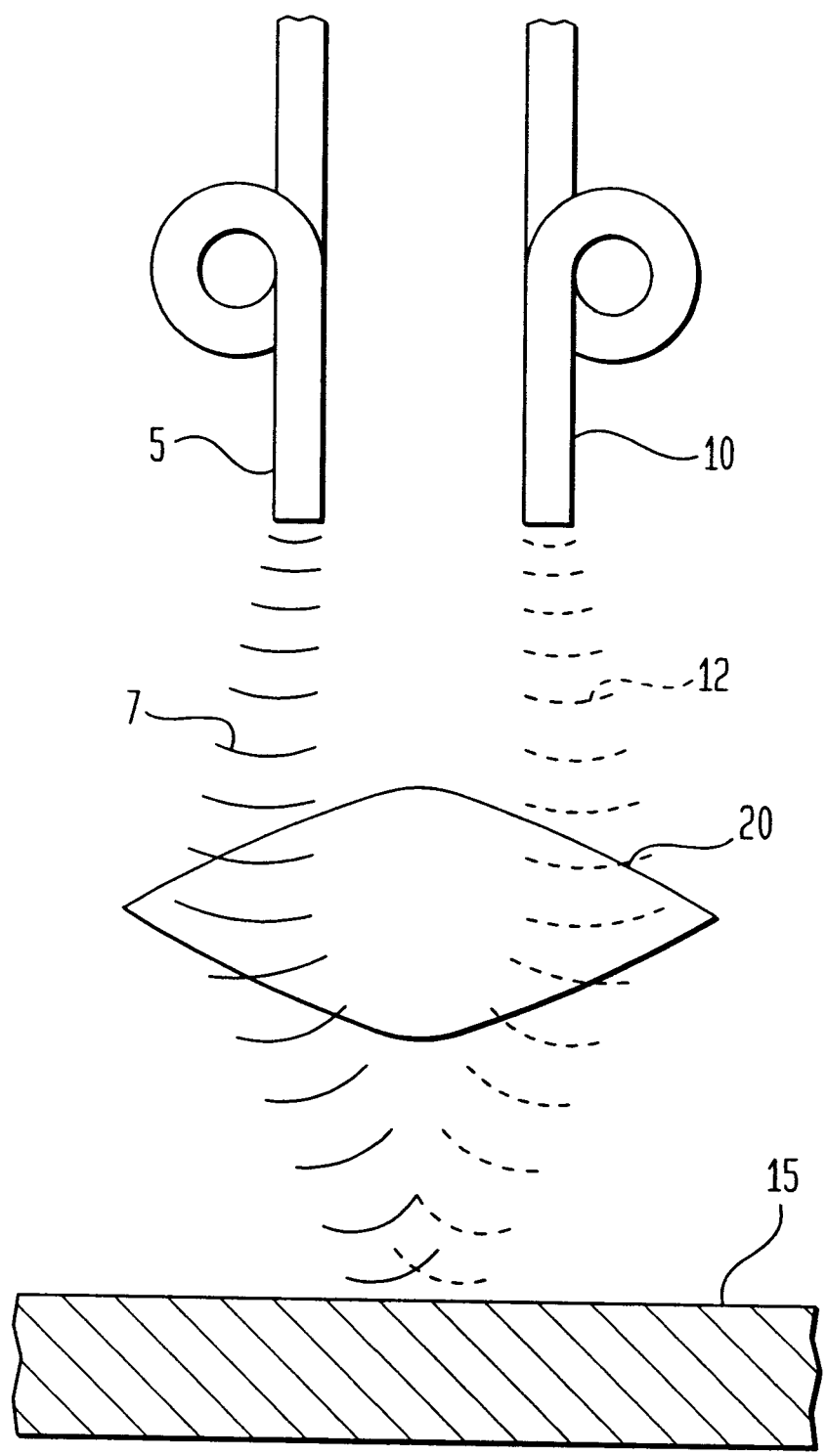
FIG. 1 illustrates the general concept of optical signal transmission between an optical signal source and an optical signal receiver.
Figure 2:
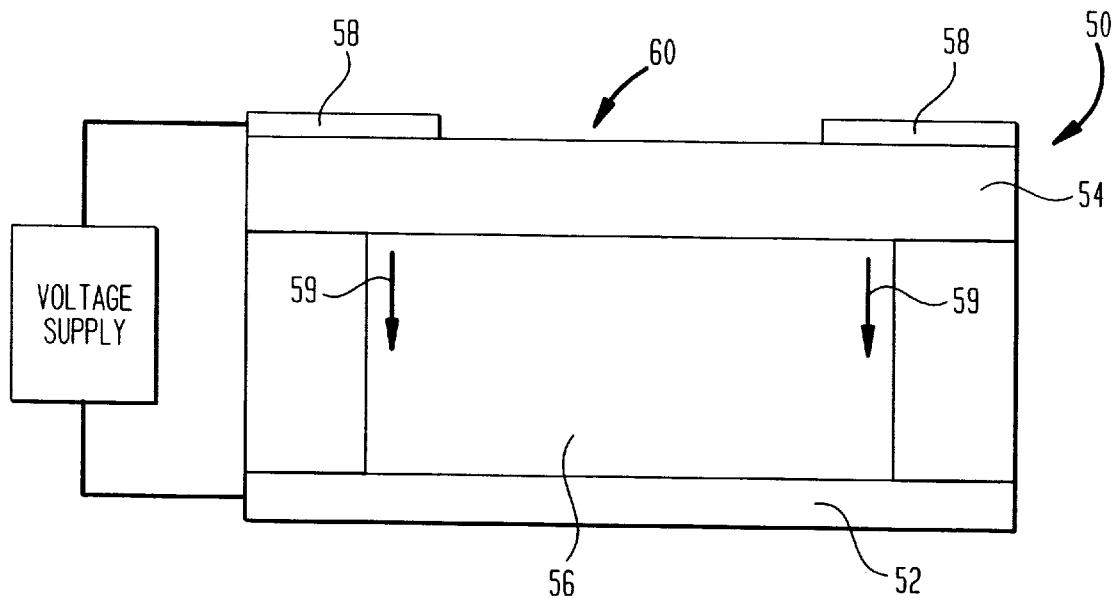
FIG. 2 is a cross-sectional view of a prior art MARS modulator.
Figure 3:
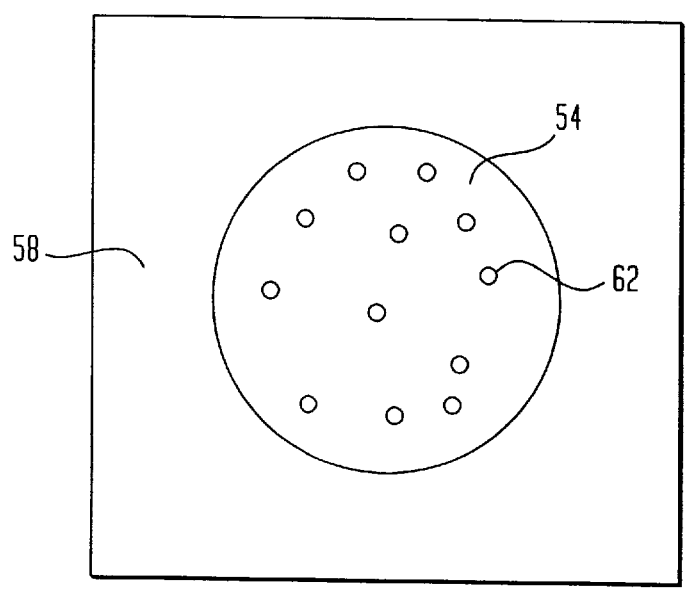
FIG. 3 is a top view of the prior art MARS modulator shown in FIG. 2.
Figure 4:
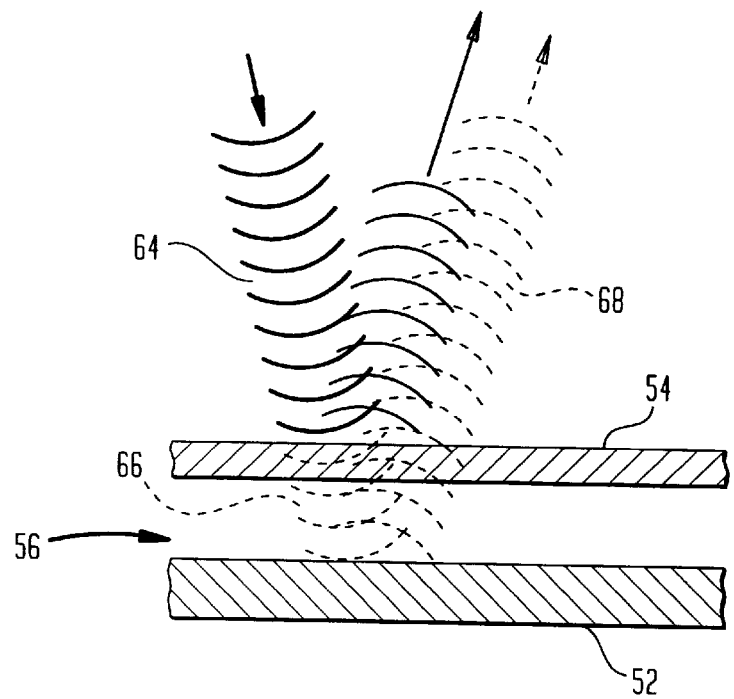
FIG. 4 is a partial cross-section view of the prior art MARS modulator of FIG. 2.
Figure 5:
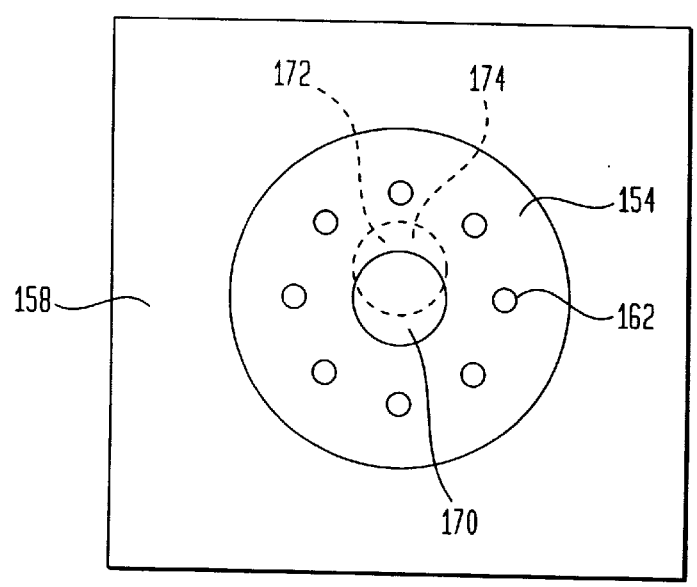
FIG. 5 is a top view of a variable attenuator in accordance with a preferred embodiment of the present invention.
Figure 6:
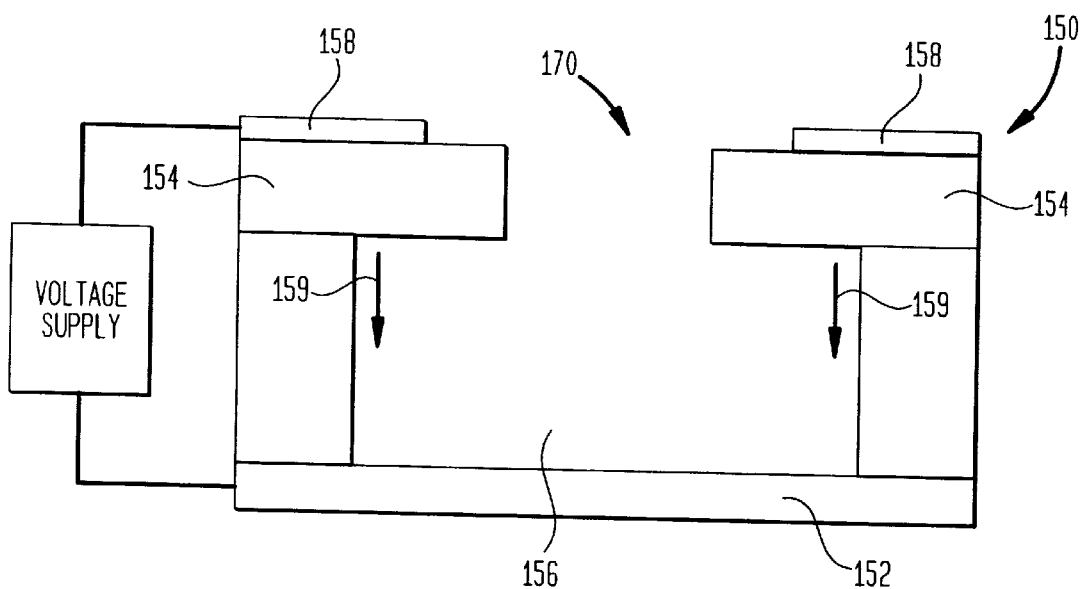
FIG. 6 is a cross-sectional view of a first embodiment of an attentuator in accordance with the present invention.
Figure 7:
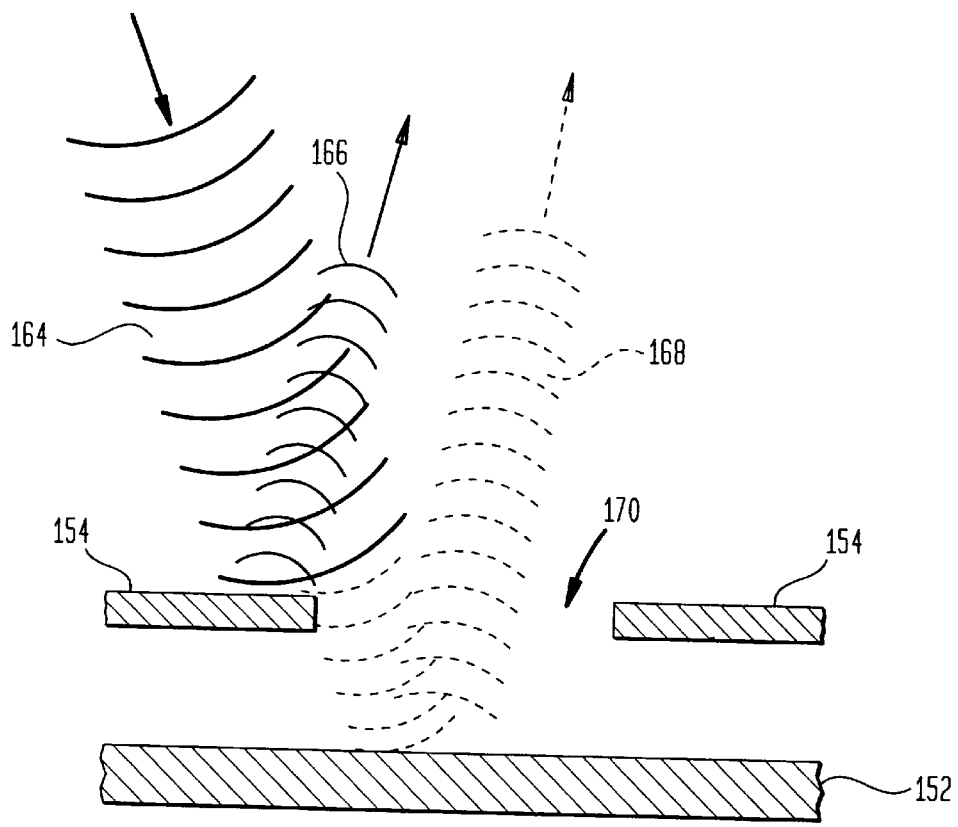
FIG. 7 is a partial cross-sectional view of the attentuator of FIG. 6.

FIGS. 5–7 illustrate different views of an attenuator according to a first embodiment of the present invention. Referring to FIGS. 5–6, the reflective portions are divided by including a "large hole" 170 in the membrane 154 after coating the membrane with a high reflectivity (HR) coating. The floor 152 of the cavity is also coated with an HR coating. Note that it is not necessary to coat the entire regions indicated but only the regions that are illuminated by the incident beam, namely the middle region of the membrane 154 and the cavity floor 152 that is visible through the large hole 170. The illuminated area 172 (shown as a dotted circle) of the attenuator includes two portions or regions: (1) the crescent shaped area 174 on the membrane 154, and (2) the portion of the cavity floor 152 illuminated by the beam through the large hole 170. In a preferred embodiment, emphasizing high attenuations, the reflections from these two portions are approximately equal.

FIG. 7 illustrates the light reflection paths generated by the attenuator shown in FIGS. 5 and 6. A sending beam 164 from an optical signal source (not shown) is directed towards the membrane 154 such that a portion of the sending beam 164 falls upon the highly reflective coating on the membrane 154 and a second portion of the sending beam 164 continues through the hole 170 and falls upon the reflecting surface of substrate 152. This forms a divided reflected signal comprising a first returning beam 166 and a second returning beam 168.

Depending upon the cavity width (and slightly upon the angle of incidence), the phase difference between the two reflections will constructively or destructively interfere. By varying the electrostatic forces on the membrane 154, one can cause the cavity width to be varied. The amount of interference between the two reflected portions can be adjusted to achieve the degree of attenuation from input single-mode fiber to output single-mode fiber by voltage control.

Figure 8A:
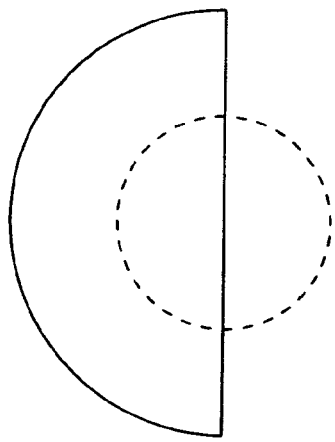
FIGS. 8(a) through 8(d) illustrate alternative configurations for the large hole of the device depicted in FIG. 7.
Figure 8B:
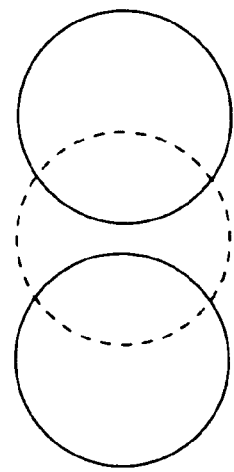
Figure 8C:
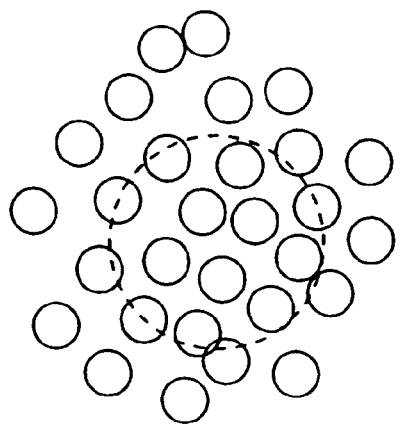
Figure 8D:
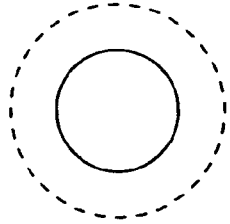

It is not necessary to use a single round hole as in the hole 170 in FIG. 5; the shape, size and number of holes in the membranes can be varied and still achieve a high level of attenuation. For example, in FIG. 8(a), a non-round hole is shown. This shape may be used to split the illuminated portions (shown as dotted lines) of each reflecting surface more evenly. In FIG. 8(b) two holes are used so that slight errors in locating the illuminated area or in sizing the illuminated area will have less effect upon the fraction of the illumination returned from the cavity floor 152. FIG. 8(c) shows the use of numerous, smaller holes, and FIG. 8(d) shows the use of a moderate sized hole that is overfilled by the illumination beam.

Figure 9:
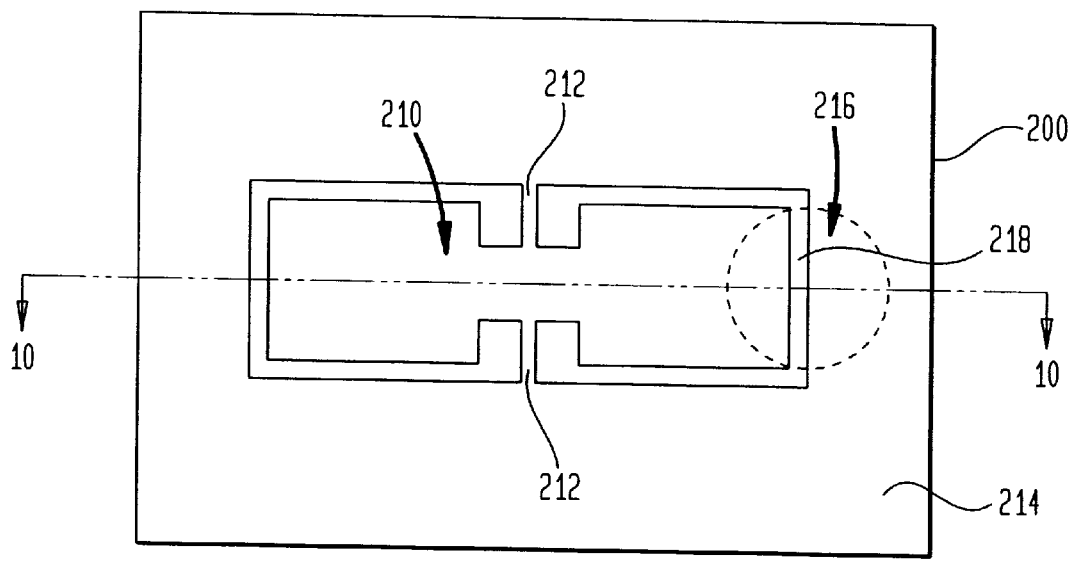
FIG. 9 is a top view of a second embodiment of an attenuator in accordance with the present invention.
Figure 10:
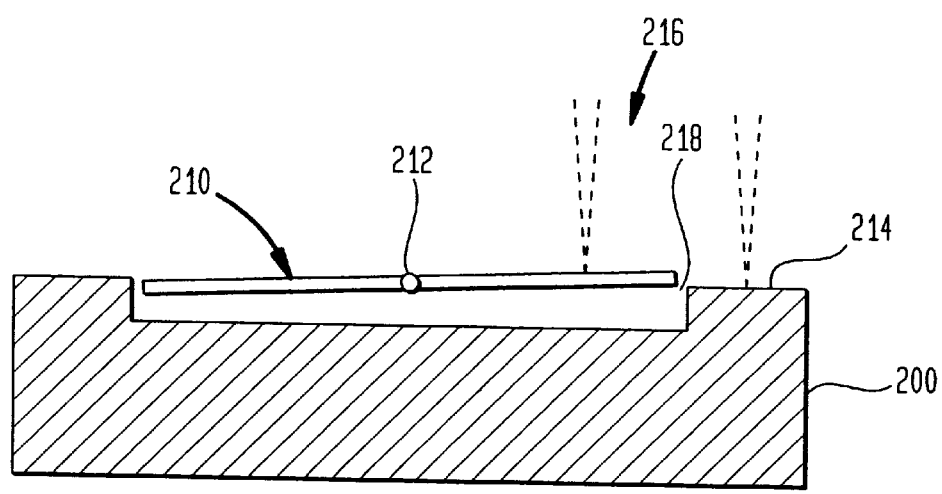
FIG. 10 is a cross-sectional side view of the embodiment depicted in FIG. 9, taken along line 10—10.

In a second embodiment, of the present invention reflective surfaces that are side-by-side are used in the attenuator as shown in, e.g., FIGS. 9 and 10, with one of the surfaces being moveable with respect to the other. Referring to FIGS. 9 and 10, the silicon chip 200 is seen from above and in cross-section, respectively. A moving surface 210, called a "see-saw" herein, pivots on torsion hinge mountings 212. As can be seen in FIG. 10, the right side of moving surface 210 is further away from the floor of the silicon chip 200 than the left side thereof. Maximum reflective coupling occurs for a light beam directed at the silicon chip 200 when the see-saw's top right edge is even with the top of the neighboring surface 214 of the chip 200; then the reflecting surface will appear to be an ordinary HR plane with a slight gap 218 (vertical slit) in the middle of the illuminated area 216. To maximize this coupling, the width of gap 218 relative to the light beam's diameter should be minimized.

The voltage sensitivity of motion of the see-saw depends upon the electrostatic forces that can be produced for a given voltage (as with the membrane designs) and, more specifically, upon the torque (unbalanced force) that can be supplied. The logical way to supply torque is to provide an electrical field only on the right or only on the left side of the see-saw 210. For a given torque, the deflection will be proportional to the radius (distance from the point of rotation of the see-saw) and the weakness of the torsional restoring force of the torsional hinges. Narrowing the hinges and making them longer are two ways to reduce the restoring forces of the see-saw. Thus one can expect that very high voltage sensitivities can be achieved. If more precision is desired, a damping mechanism can be included in the attenuator so that any mechanical oscillation that would be set up each time the voltage was changed would dissipate quickly. The damping mechanism could be the viscous drag of the surrounding gas, and it will be necessary to provide the right mix and size of holes in the see-saw 210 to provide sufficient damping. The damping will also be influenced by the amount of clearance between the see-saw 210 and the surrounding walls.

Figure 11:
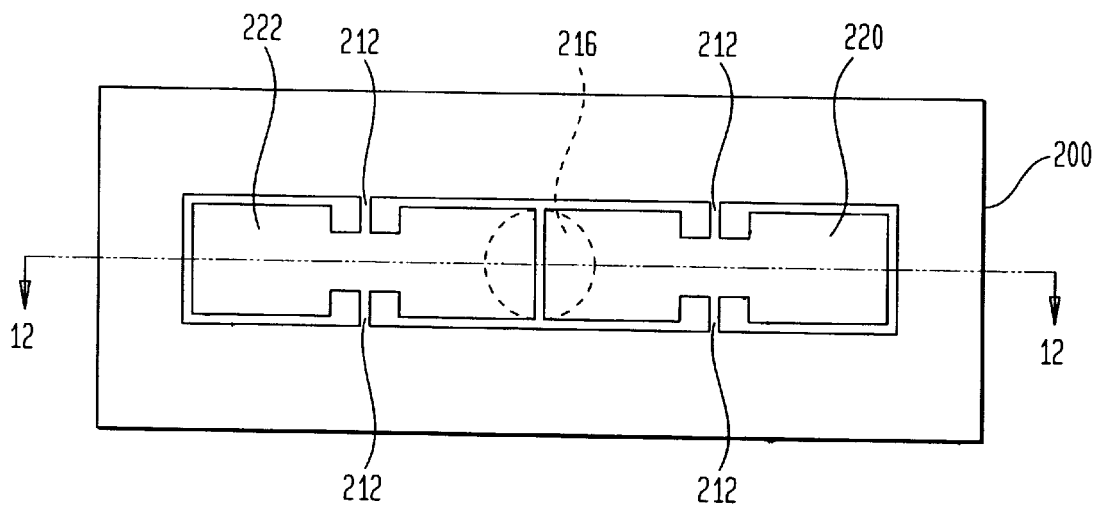
FIG. 11 is a top view of a third embodiment of an attenuator in accordance with the present invention.
Figure 12:
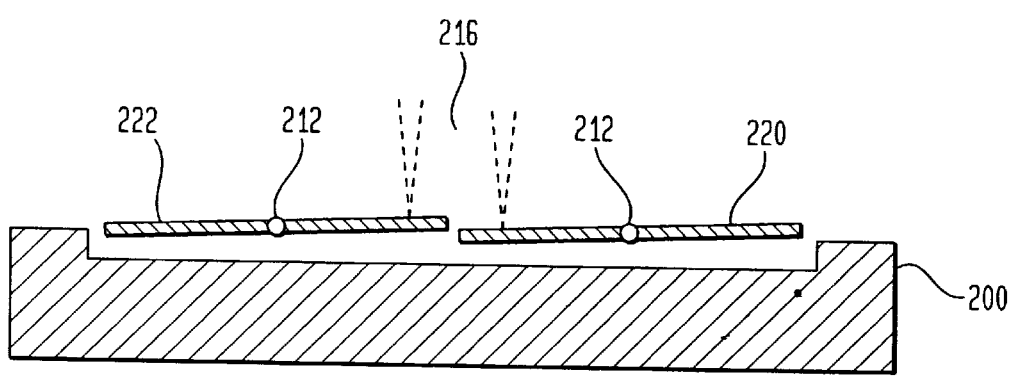
FIG. 12 is a cross-sectional side view of the attentuator depicted in FIG. 11 taken along line 12—12.

The sensitivity and symmetry of the attenuator can be improved by using two neighboring see-saws 220 and 222 as shown in, e.g., FIGS. 11 and 12 illustrates an attenuator according to a third embodiment of the present invention. By directing the light beam 216 to straddle both see-saws 220 and 222 as shown, and applying the same forces to each one, twice the phase shift can be achieved.

Another group of variations comes from exploiting the transparency of silicon in the region of the infrared used for the variable attenuator. If the silicon is transparent and one (optionally) applies an AR (Anti-Reflecting) coating to the underside of the silicon chip and elsewhere as needed, one can make a variable reflective coupling through the underside.

It is not necessary for any of the designs to have the edges of the HR coatings be coincident with the edges of the holes or of the see-saws; the edges can be lithographically defined instead so that there is less danger of edge curling. The edges formed in this manner are less likely to produce as much scattering. The HR coating can be on the underside of the membrane/see-saw, or it can be on the top side or on both sides.

Further variations are to use coatings which are a little less highly reflective, i.e., coatings which are designed to transmit a fixed fraction, (e.g., 1%) of the incident light. In this manner the amount of power in the incident beam can be measured, in exchange for a slightly higher coupling loss. If the HR coatings have been replaced by coatings having a light transmitting property, a "tapped" portion of the beam emerges that can be measured with a photodetector. Regardless of the cavity width variation (in the order of half a wavelength), the photodetector will report the same power level; in effect, an "input" monitor or fiber tap is created. The power that will be coupled to the output single-mode fiber will see the interference effects of the reflected beams, but the photodetector observing the transmitted beams will not. The total reflected light is not affected by the interference condition; the coupling of the reflected power to the particular collection fiber is what is varying with interference. The technique of providing an input monitor can be used for variable attenuators that are illuminated from the top as well, provided that the underlying material is transparent. One application of this fiber tap would be closed-loop control.

The above method of attenuation, using two divided surfaces, results in a substantial increase in attenuation control over the prior art.

An attenuator based upon two surfaces of equal illumination and with separation δ has a linear coupling C of approximately:

$$C = \cos^2(2\pi\delta/n) \text{ [on reflection from the divided surface]}$$

where the wavelength in the surrounding medium is n. The attenuation using this method is wavelength independent at low attenuation values (C almost 1.0). However, for higher attenuation values a "tilt" occurs, i.e., the attenuation varies with wavelength. Nearly flat wavelength response is achievable by using unequal illumination as set forth in the equation:

$$C = |(1-f) + f^* \exp[j(4 \exp[j(4\pi\delta/n)]]|^2$$

where f is the fractional amplitude of light falling on one surface and (1−f) is the fractional amplitude of light falling on the other surface. Nearly constant wavelength response can be achieved around where 4δ/=n, namely where the separation of the surfaces is a multiple of a quarter wavelength. When a multiple of a quarter wavelength exists, then $\exp[j(4\pi\delta/n)]$ is +1 or −1, for n even or odd, respectively. For the even n case, C=1 (very little attenuation) and for the odd n case, $C = 1(1-2_F)^2$. By adjusting the value of f, any value of attenuation (with a more or less flat response) can be achieved.

However, the choice of f is usually determined at the time of manufacture and is therefore not easily controlled by prior art methods. To overcome this problem, interferometry by reflection from more than 2 surfaces with independent motion can be used. Thus, instead of only one separation parameter, such as the δ, above, at least two separation parameters can be controlled electrically. Following are two exemplary ways that four independently controlled surfaces can be used; it is understood that a different number, such as three, six, or more surfaces could be used.

Figure 13:
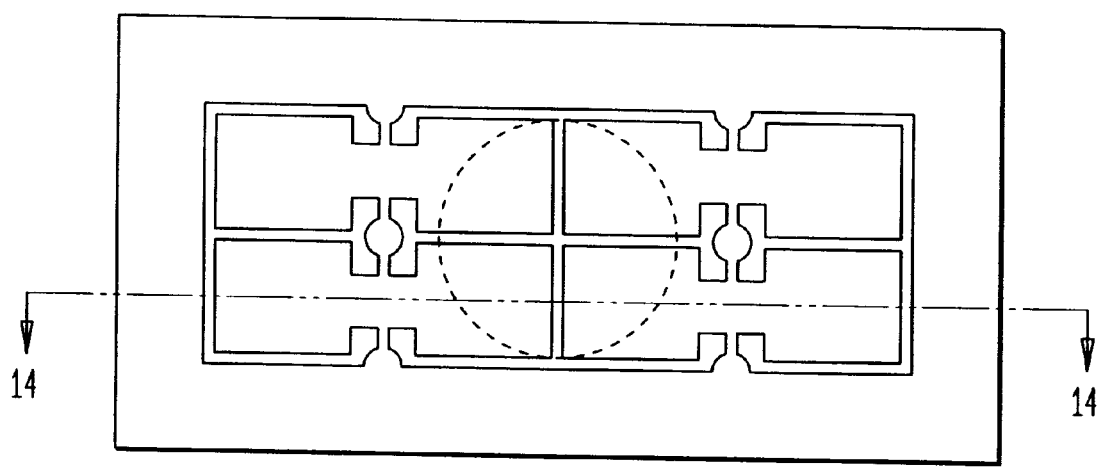
FIG. 13 is a top view of a fourth embodiment of an attenuator in accordance with the present invention.
Figure 14:
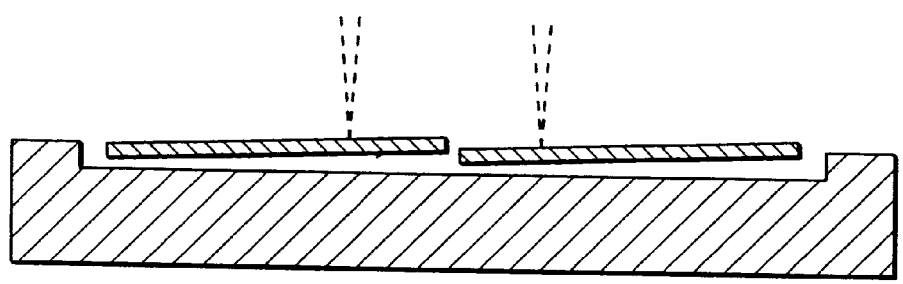
FIG. 14 is a cross-sectional view of the embodiment depicted in FIG. 13, taken along line 14—14.
Figure 15:
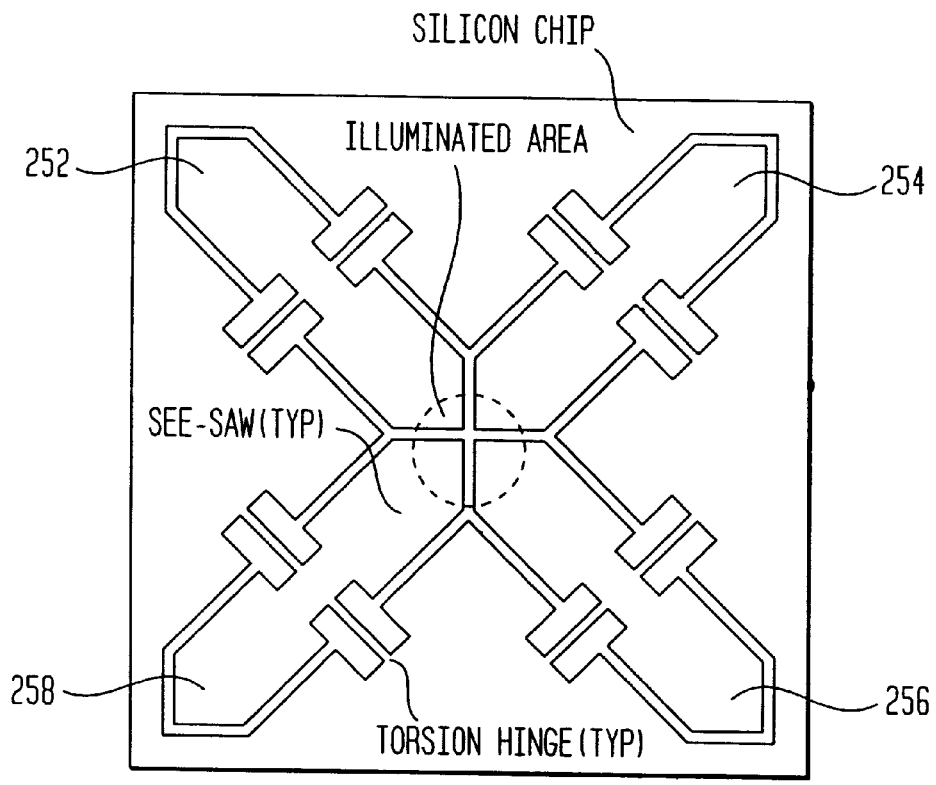
FIG. 15 is a top view of a fifth embodiment of an attenuator in accordance with the present invention.

FIGS. 13 and 14 show the use of four reflecting surfaces in an attenuator according to a fourth embodiment of the present invention with the illumination equally divided four ways between the four surfaces. The close proximity of the torsional hinges for the upper and lower pairs of see-saw structures is somewhat limiting; thus, as shown in, e.g., FIG. 15, the shape of the ends of the four see-saw structures is modified, enabling the four ends to be situated together without bringing the torsional hinges as close as in FIG. 13. Although a particular shape is shown in FIG. 15, other shapes for the ends of the four see-saw structures are contemplated as part of the present invention. Thus, using the configuration of FIG. 15 showing an attenuator according to a fifth embodiment of the present invention, the torsional hinges can be lengthened if desired, to reduce their stiffness for a given width.

The electrical connections needed for providing electrostatic control of the tilt of each see-saw structure are not shown. One way to provide these connections is by conductive film traces that lead from the see-saw structure across one or both torsional hinges of a given structure onto the non-moving remaining surface of the silicon chip, where electrical bonding pad areas can be provided. As shown in FIG. 15, the illumination does not have to be equally supplied to all four structures.

Figure 16:
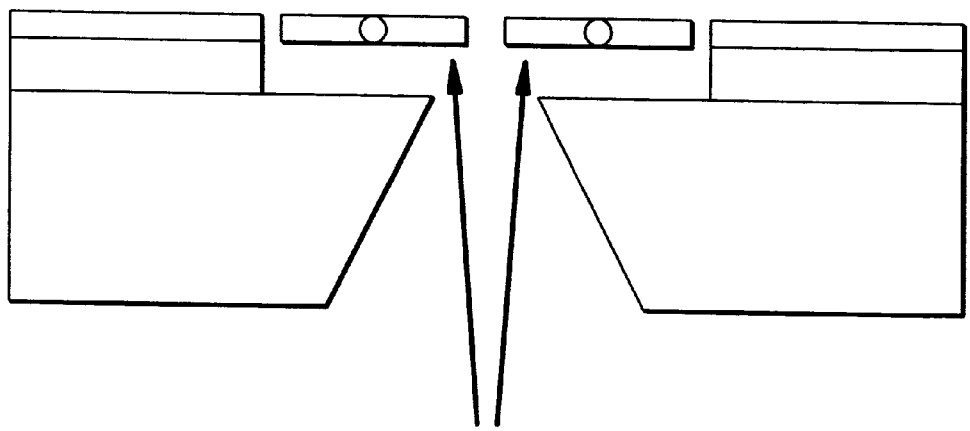
FIG. 16 is a cross-sectional view of a sixth embodiment of an attenuator in accordance with the present invention.

Although in the above description the light source is directed from above the substrate, with the membrane or see-saw positioned between the light source and the substrate, as an alternative, as shown in FIG. 16, a hole could be formed in the substrate and the see-saw positioned such that the substrate is situated between the light source and the see-saw. In this embodiment, the underside of the see-saw and the side of the substrate nearest to the light source would optimally be the coated surfaces. As is clear to one of ordinary skill in the art, the theory of operation of this embodiment is essentially the same as that of the previously described embodiments, the primary difference being that the optical signal is transmitted past the substrate through the hole formed therein and is reflected off of the see-saw.

While there has been described herein the principles of the invention, it is to be understood by those skilled in the art that this description is made only by way of example and not as a limitation to the scope of the invention. Accordingly, it is intended by the appending claims, to cover all modifications of the invention which fall within the true spirit and scope of the invention.

We claim:

1. An attenuator for variably attenuating an optical signal, said attenuator comprising:
   a plurality of reflective portions for entirely reflecting any portion of an optical signal impinging thereon and thereby generating a plurality of reflected optical signals which are combined as an attenuated optical signal, wherein at least one of said reflective portions is moveable with respect to the rest of said plurality of reflective portions.

2. An attenuator as set forth in claim 1, wherein said plurality of reflective portions comprises a micromechanical device for selectively moving said at least one moveable reflective portion using voltage signals.

3. An attenuator as set forth in claim 1, wherein said at least one moveable reflective portion is positioned at a predetermined distance above another one of said plurality of reflective portions, said at least one moveable reflective portion including an aperture formed therein for enabling a portion of said optical signal to be transmitted through said aperture and reflected off of said another reflective portions to generate one of said reflected optical signals.

4. An attenuator as set forth in claim 3, wherein said predetermined distance is a function of an electrostatic potential that exists between said at least one moveable reflective portion and said another reflective portion.

5. An attenuator as set forth in claim 4, further comprising a controller, coupled to an optical signal source that generates said optical signal, for controlling said attenuator as a function of said optical signal.

6. An attenuator as set forth in claim 5, wherein said controller selectively varies said electrostatic potential as a function of said optical signal.

7. An attenuator as set forth in claim 1, wherein said at least one moveable reflective portion comprises at least one pivotable surface pivotably moveable relative to said other reflective portions.

8. An attenuator as set forth in claim 7, wherein said at least one moveable reflective portion comprises a see-saw shaped member having said at least one pivotable surface and wherein said at least one moveable reflective portion is positioned adjacent to one of said other reflective portions so that said optical signal straddles and is reflected off of said at least one moveable reflective portion and said adjacent one of said other reflective portions.

9. An attenuator as set forth in claim 8, wherein said adjacent one of said other reflective portions is stationary.

10. An attenuator as set forth in claim 8, wherein said adjacent one of said other reflective portions is pivotably moveable with respect to said at least one moveable reflective portion.

11. An attenuator as set forth in claim 1, further comprising a substrate disposed a predetermined distance from said plurality of reflective portions, said substrate including a through-aperture formed therein enabling said optical signal to be transmitted past said substrate and impinge on said plurality of reflective portions.

12. An attenuator as set forth in claim 1, wherein each of said plurality of reflective portions has a fixed reflectivity.

13. An attenuator as set forth in claim 1, wherein said at least one moveable reflective portion includes four moveable reflective portions that are pivotably moveable, wherein ends of said four moveable reflective portions are positioned adjacent to each other so that said optical signal can be focused on said ends.

14. An attenuator as set forth in claim 13, wherein said four moveable reflective portions are positioned in an X-shaped configuration.

15. An attenuator as set forth in claim 1 further comprising a power monitor for measuring the power of the optical signal.

16. An attenuator as set forth in claim 15, wherein said power monitor comprises a fiber tap.

17. A method of variably attenuating an optical signal incident on a plurality of reflective portions, said reflective portions entirely reflecting any portion of said optical signal impinging thereon, said method comprising the steps of:
   focusing said optical signal onto said reflective portions and thereby generating a plurality of reflected optical signals, wherein at least one of said reflective portions is moveable with respect to the rest of said reflective portions; and
   combining said reflected optical signals to generate an attenuated optical signal.

18. A method as set forth in claim 17, further comprising:
   pivotably moving said at least one moveable reflective portion so as to control interference among said reflected optical signals.

19. A method as set forth in claim 17, wherein each of said plurality of reflective portions has a fixed reflectivity.

20. An attenuator for variably attenuating an optical beam, said attenuator comprising:

a first reflective portion for receiving a first portion of said optical beam and entirely reflecting said first portion of said optical beam; and a second reflective portion, positioned adjacent to and pivotably moveable with respect to said first reflective portion, for receiving a second portion of said optical beam and entirely reflecting said second portion of said optical beam, whereby said reflected first and second portions of said optical beam are combined as an attenuated optical beam.

21. An attenuator as set forth in claim 20, wherein said first reflective portion is pivotably moveable with respect to said second reflective portion.

22. An attenuator as set forth in claim 20, wherein each of said first and second reflective portions has a fixed reflectivity.

* * * * *